W. C. CODD.
PIPE COUPLING.
APPLICATION FILED SEPT. 22, 1917.
1,307,392.
Patented June 24, 1919.
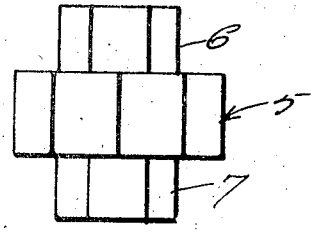
Fig. 1.
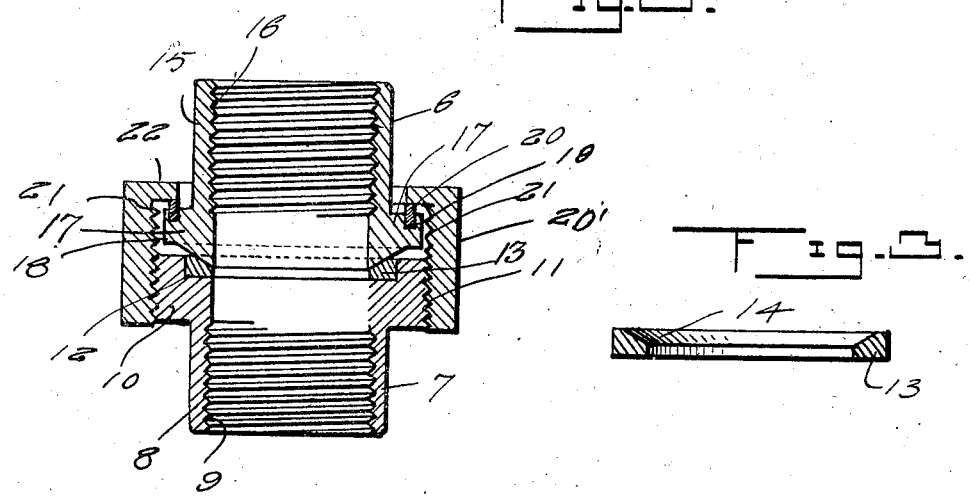
Fig. 2.
Fig. 3.
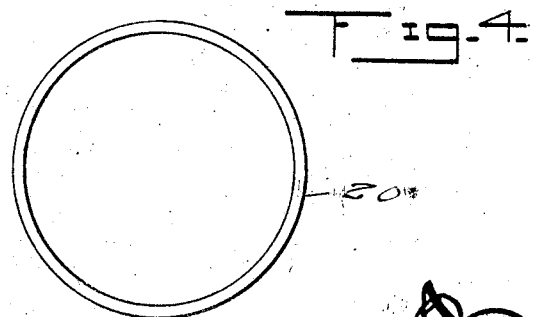
Fig. 4.
Inventor
W. C. Codd.

UNITED STATES PATENT OFFICE.

WILLIAM C. CODD, OF BALTIMORE, MARYLAND.

PIPE-COUPLING.

1,307,392.

Specification of Letters Patent. Patented June 24, 1919.

Application filed September 22, 1917. Serial No. 192,717.

*To all whom it may concern:*

Be it known that I, WILLIAM C. CODD, a citizen of the United States, residing at Baltimore, and State of Maryland, have invented certain new and useful Improvements in Pipe-Couplings; and I do hereby declare the following to be a full, clear, and exact description of the invention, such as will enable others skilled in the art to which it appertains to make and use the same.

This invention relates to improvements in pipe couplings.

The object of this invention is to provide a pipe coupling having a stationary soft metal seat between the opposing faces of the sections of the coupling and thereby prevent leakage.

A further object of this invention is to provide a double seat to produce security against leakage should one of the seats become defective.

A still further object of this invention is to provide a pipe coupling having a ball joint to insure perfect contact, obviating the requirement of washers, gaskets or the like and to provide a soft metal seat at the point of juncture of the two sections, this seat being of different metal than the sections of the joints to prevent corrosion at this point.
A further object of this invention is to provide a pipe coupling of this character, which will be simple, practical and comparatively inexpensive in construction and one that can be manufactured and sold at a low cost.

With these and other objects in view, the invention consists in the novel combination and arrangement of parts hereinafter more fully described and set forth in the claims hereto appended.

In the drawing,

Figure 1 is a side elevation of the pipe coupling, made in accordance with this invention, Fig. 2 is a vertical longitudinal sectional view of the same, Fig. 3 is a transverse sectional view of one soft metal washer, and Fig. 4 is a top plan view of another metal washer.

Like numerals of reference designate corresponding parts in all the figures of the drawings.

Referring to the drawings, the numeral 5 designates the pipe coupling in its entirety and it consists in its construction of a male section 6 and a female section 7. The female section 7 comprises a cylindrical body 8 provided with the interior screw threads 9 and the body 8 is provided at one end with an enlarged annular flange 10 which is provided with the exterior screw threads 11. The annular flange 10 is provided on its inner periphery at the upper edge thereof with an annular recess 12 in which is adapted to be secured the annular washer 13 which has its upper face inclined as at 14. The male member comprises a cylindrical body 15 having interior screw threads 16. One end of the body 15 is provided with an outer annular flange 17 which has an inwardly inclined face 18 which is substantially convex in cross section and forms a ball joint so that it may readily seat against the inclined face 14 of the washer 13 and thereby form a tight joint between the male and female members when in union. It is to be understood that the washer 13 is to be formed of suitable soft metal such as brass, copper or the like and by virtue of the contact of the hard metal of the male member and soft metal of the washer 13, corrosion is impossible between the two joints.

The flange 17 is provided on its outer side with an annular recess or groove 19 in which is tightly fitted a metal annular washer 20, the purpose of which will be hereinafter more fully described.

A coupling nut 20' is provided with interior screw threads 21 which are adapted to fit the screw threads 11 on the flange 10 of the female member. One end of the coupling nut is provided with an inturned annular flange 22 which is adapted to overlie the washer 20, whereby when it is threaded on the flange 10 of the female and the male and female members are drawn in tight connection with one another, the flange 22 will bind against the outer surface of the washer 20, thereby forming a double seat and consequently preventing leakage should the seat formed by the ball surface 18 and washer 13 become worn out or defective.

As will be noted more clearly from Fig. 2 of the drawings, the metal washer 20 is of substantial rectangular cross section and the flange 22 of the nut 20' is of similar cross section so that the inner face thereof engages snugly the outer or upper surface of the packing ring or washer. When the two sections of the coupling are forced together by means of the coupling nut, the inclined lower portion 18 of the male member will be forced tightly into seat or washer 13 so as to form a tight joint therewith. In addition, the washer 20 will be forced tightly into the groove or recess therefor, and a tight joint will be formed between the upper edge of this washer and the flange of the coupling nut. Also, since the under face of flange 22 of the coupling nut is plane, and a slight space is left between the inner edge of this flange and the body of the male member 6, proper centering of the male member so as to insure accurate seating thereof in the washer or seat 13 of the female member is secured, thus obtaining a tight and accurate double joint of comparatively simple construction which is absolutely fluid tight.

From the foregoing description taken in connection with the accompanying drawings it will be apparent that the sections are first placed together, the coupling nut being fitted then over the male member and threaded on the female member until its flange 22 binds against the washer 20 thereby forming a double connection between the sections.

It will be apparent that by providing two washers and two seats the union would be commonly known as a four-seated union and thereby avoid confusion in the use of a single seated washer or union, which is commonly known as a double-seated union.

What is claimed is:—

1. In a pipe coupling, a lower member provided with a beveled seat, an upper member having its lower end fitted against said seat and provided adjacent its lower end with an outer annular flange, said flange being provided in its upper face with an annular recess spaced from the periphery of said upper member, a ring washer mounted in said recess and projecting above said flange, and a coupling nut threaded upon the lower member and provided at its upper end with an inwardly projecting annular flange having its under surface plane and in tight engagement with the upper edge of the washer and having its inner edge spaced from the periphery of said upper member.

2. In a pipe coupling, a lower coupling member, an upper coupling member fitting into said lower member and provided adjacent its lower end with an outer annular flange having an annular recess in its upper face, a ring washer seated in said recess and projecting above said flange, and a coupling nut threaded upon said lower member and provided at its upper end with an inwardly projecting annular flange in tight engagement with the upper edge of said washer, said nut providing means for exerting great pressure upon the washer so as to cause slight spreading thereof and effect a tight closure between the washer and said flange.

In testimony whereof I affix my signature in presence of two witnesses.

WILLIAM C. CODD.

Witnesses:
WILLIAM HISSEY, Jr.,
JOHN EARLY CODD.